(12) United States Patent
Sanae

(10) Patent No.: US 12,476,318 B2
(45) Date of Patent: Nov. 18, 2025

(54) PROTECTIVE STRUCTURE FOR BATTERY PACK

(71) Applicant: AISIN KEIKINZOKU CO., LTD., Imizu (JP)

(72) Inventor: Tetsuya Sanae, Imizu (JP)

(73) Assignee: AISIN KEIKINZOKU CO., LTD. (JP)

( * ) Notice: Subject to any disclaimer, the term of this patent is extended or adjusted under 35 U.S.C. 154(b) by 328 days.

(21) Appl. No.: 18/193,682

(22) Filed: Mar. 31, 2023

(65) Prior Publication Data
US 2023/0387535 A1 Nov. 30, 2023

(30) Foreign Application Priority Data
May 30, 2022 (JP) .................... 2022-087403

(51) Int. Cl.
*B60K 1/04* (2019.01)
*B60R 16/04* (2006.01)
*H01M 50/242* (2021.01)
*H01M 50/244* (2021.01)
*H01M 50/249* (2021.01)

(52) U.S. Cl.
CPC ............ *H01M 50/249* (2021.01); *B60K 1/04* (2013.01); *B60R 16/04* (2013.01); *H01M 50/242* (2021.01); *H01M 50/244* (2021.01); *B60K 2001/0438* (2013.01)

(58) Field of Classification Search
CPC .. H01M 50/24; H01M 50/242; H01M 50/244; H01M 50/204; H01M 50/262; H01M 2220/20; B60K 1/04; B60K 16/04; B60K 6/28; B60K 2001/0438
See application file for complete search history.

(56) References Cited

U.S. PATENT DOCUMENTS

2014/0338996 A1* 11/2014 Baccouche .......... B62D 21/152
180/68.5

FOREIGN PATENT DOCUMENTS

JP 2020-183222 A 11/2020
JP 2021-070386 A 5/2021

* cited by examiner

*Primary Examiner* — Jason D Shanske
*Assistant Examiner* — James J Triggs
(74) *Attorney, Agent, or Firm* — Harness, Dickey & Pierce, P.L.C.

(57) ABSTRACT

A protective structure for a battery pack mounted under a floor of a vehicle, includes: a case body accommodating the battery pack; and a under member arranged below the case body. The under member includes: a plurality of panels; and a plurality of fitting portions that connect adjacent panels of the plurality of panels to each other. Each of the plurality of fitting portions includes: a fitting recess provided to either one of the adjacent panels; and a fitting piece provided to the other of the adjacent panels and fitting into the fitting recess.

5 Claims, 2 Drawing Sheets

PROTECTIVE STRUCTURE FOR BATTERY PACK

CROSS REFERENCE TO RELATED APPLICATIONS

This application is based upon and claims the benefit of priority to Japanese Patent Application No. 2022-087403 filed on May 30, 2022, the entire contents of which are incorporated herein by reference.

BACKGROUND OF THE INVENTION

Technical Field

The present disclosure relates to a protective structure for a battery pack as a drive source mounted in an electric vehicle, a hybrid vehicle, or the like, and particularly to a protective structure for a battery pack mounted under a floor of a vehicle.

Related Art

Instead of a structure for mounting a battery pack in a space of a vehicle body such as the rear side or the front side of the vehicle, it has been recently considered to provide a structure for mounting a battery pack under a floor of a vehicle body.

When a battery pack is mounted under a floor of a vehicle, it is necessary to protect a battery from a load upwardly applied from below due to, for example, an uneven road surface or jumping stones during traveling of the vehicle.

The present inventors have developed a protective structure for a battery pack in which a plurality of panel members connected by a pair of protrusion and recess adjacent to each other (a set of fitting) is arranged under the battery pack, as disclosed in JP-A-2020-183222 and JP-A-2021-70386.

SUMMARY

Figure 1:
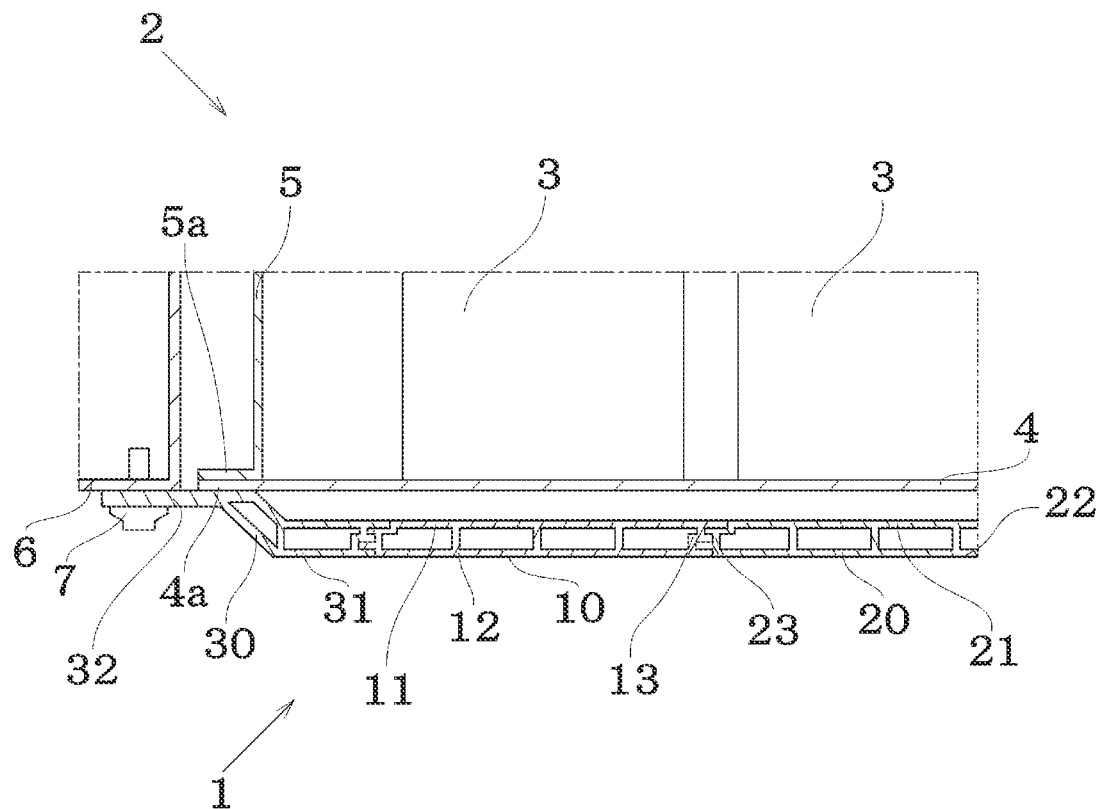
FIG. 1 illustrates an example of a protective structure for a battery pack according to the present disclosure.

An object of the present disclosure is to provide a protective structure for a battery pack that exerts an excellent protective effect against an external impact when the battery pack is mounted under a floor of a vehicle.

In accordance with one of some embodiments, there is provided a protective structure for a battery pack mounted under a floor of a vehicle, the protective structure comprising:
a case body accommodating the battery pack; and a under member arranged below the case body,
the under member including: a plurality of panels; and a plurality of fitting portions that connect adjacent panels of the plurality of panels to each other, and
each of the plurality of fitting portions including: a fitting recess provided to either one of the adjacent panels; and a fitting piece provided to the other one of the adjacent panels and fitting into the fitting recess.

Here, a plurality of fitting portions that connect adjacent panels to each other means that there are at least two or more sets of fitting portions each set including one fitting recess and one fitting piece that is fitted into the one fitting recess.

Among a plurality of panels forming a under member, adjacent panels are provided with a plurality of fitting portions, each including a fitting recess and a fitting piece, and the fitting portions are connected to each other, to thereby increase rigidity of the connection part more than that of the related art.

When a load is applied to the under member from below and the outside, a stress can be efficiently distributed to the adjacent panels via the plurality of fitting portions; therefore, the strength of the under member becomes increased as a whole.

Accordingly, it is possible to eliminate welding for ensuring the strength as in the related art, and it is possible to reduce the labor and cost of the welding.

Note that a case body that accommodates the battery pack is the same that accommodates a so-called rechargeable battery, which is repeatedly chargeable and useable, and control equipment thereof, etc., and there are no particular limitations on the structure of the case body.

In accordance with one of some embodiments, there is provided the protective structure for the battery pack, wherein
each of the plurality of fitting portions may include a pair of the fitting recess and the fitting piece, one of the pair including a locking portion, and the other of the pair including a locked portion, and
the locking portion and the locked portion may come into a mutual locking state at least when a load is upwardly applied from below the under member.

A pair of the locking portion and the locked portion may be locked to each other in advance within a range where mutual fitting and assembly is possible; however it is sufficient that when a load is applied to the under member, the locking portion and the locked portion at least come into a mutual locking state. With this configuration, it is possible to prevent the panels from separating from each other even if a load is applied, which increases the strength at the connection part.

In accordance with one of some embodiments, there is provided the protective structure for the battery pack, wherein
when no load is applied, a predetermined clearance may be provided between the locking portion and the locked portion. Accordingly, it is possible to facilitate the assembly work.

In addition, as a result of providing the connection part between the adjacent panels with the plurality of fitting portions, there can be provided at least two or more pairs of fitting recesses and fitting pieces, each pair including a fitting recess and a fitting piece having a locking portion and a locked portion that can be locked to each other.

Therefore, even if a load is applied to any of the panels forming the under member, the locking portion and the locked portion provided to any of the fitting portions come into a mutual locking state, to thereby more easily ensure the strength at the connection part.

Each of the panels forming the under member may have a hollow cross sectional shape and be made of an aluminum alloy extruded material, for example.

As a result, it is possible to absorb an input load from the outside by deformation of the hollow part; therefore, it is possible to achieve both improvement in protection strength and weight reduction.

In accordance with one of some embodiments, there is provided the protective structure for the battery pack, wherein in one panel of the adjacent panels two fitting recesses among the plurality of fitting portions are provided and aligned in an up-down direction, and a distance from an endmost surface of the one panel to a bottom portion of the lower fitting recess among the two fitting recesses is longer than a distance from the endmost surface to a bottom portion of an upper fitting recess among the two fitting recesses, and in the other panel of the adjacent panels two fitting pieces among the plurality of fitting portions are provided, and positions of vertexes of the two fitting pieces may be different corresponding to positions of the bottom portions of the two fitting recesses.

That is, when the fitting recesses provided to one panel have different depths to the bottom portions, which form the recesses of these fitting recesses, the other panel can have the fitting pieces having vertexes at the positions corresponding to the bottom portions.

For example, of the two fitting recesses provided to one panel, when a bottom portion of a second recess is arranged below a first recess located above, a fitting piece fitted in the second recess is located substantially below a bottom portion of the first recess. As a result, a load from the fitting piece fitted in the second recess can be received also on the bottom portion of the first recess, which exerts an excellent strength against the impact.

According to the protective structure of the battery pack according to the present disclosure, the under member arranged under the battery pack is formed by the plurality of panels, and the adjacent panels are connected to each other by fitting the plurality of fitting portions to each other; therefore, the rigidity at the connection part becomes higher than that of the related art, and the stress applied on the panel can be sufficiently distributed to the adjacent panel via the plurality of fitting portions, to thereby enhance the effects of protecting the battery pack against an impact from the outside.

DETAILED DESCRIPTION

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

Hereinafter, an example of the protective structure for the battery pack mounted in the vehicle according to the present disclosure will be described with reference to the drawings.

FIG. 1 illustrates a cross sectional view of a part of the battery pack that is mounted in the vehicle.

The protective structure for the battery pack includes: a under member 1 including a plurality of panels; and a case body 2 provided above this under member 1, and a plurality of battery packs 3 that serve as a drive power source of the vehicle is accommodated inside the case body 2.

There are no particular limitations on the structure of the case body 2, and when the case body is mounted below the floor line of the vehicle body, it is preferable to prevent water from entering from the outside.

The case body 2 of the present embodiment is configured such that a flange 5a of a side wall 5 having an L-shaped cross section is fixed to a plate-shaped lower part 4 to uprightly provide the side wall 5 in a frame shape with respect to the lower part 4.

Of the lower part 4 of the case body 2, a fixing portion 4a located to face or outward of the flange 5a is directly fixed to the under member 1 as illustrated in FIG. 1.

The case body 2 may be indirectly fixed to the under member 1, and an intermediate panel (for example, a first panel 10, etc.) described later of the under member 1 and the lower part 4 of the case body 2 may be fixed to each other.

The under member 1 includes: a pair of fastening panels 30 located on both end sides; and a plurality of intermediate panels 10, 20 that connect the fastening panels 30, and each of the panels 10 to 30 is an example of a panel made of an extruded aluminum alloy material. Note that the pair of fastening panels 30 can be fastened to the vehicle body frame 6 with a fastening member 7 at positions in plan view outside the area in which the plurality of battery packs 3 can be mounted as illustrated in FIG. 1.

The number of the intermediate panels 10, 20 is not particularly limited, and in the following description, it is described that the adjacent intermediate panels are the first panel 10 and the second panel 20; however, one of the adjacent panels may be the fastening panel 30.

The first panel 10 and the second panel 20 each have a plurality of ribs that connect upper surfaces 11, 21 to lower surfaces 12, 22, respectively, and hollow parts may be formed therebetween.

Each fastening panel 30 includes a fastening portion 32 extending upward and outward from a connecting portion 31 connected to the intermediate panel 10; and the present embodiment is an example in which the fixing portion 4a of the lower part 4 of the case body 2 is fixed to this fastening portion 32, and the fastening portion 32 is fastened and fixed to the vehicle body frame 6 with a fastening member 7. The intermediate panels 10, 20 are disposed below the case body 2 and a space is provided between the intermediate panels 10, 20 and the case body 2.

Figure 2:
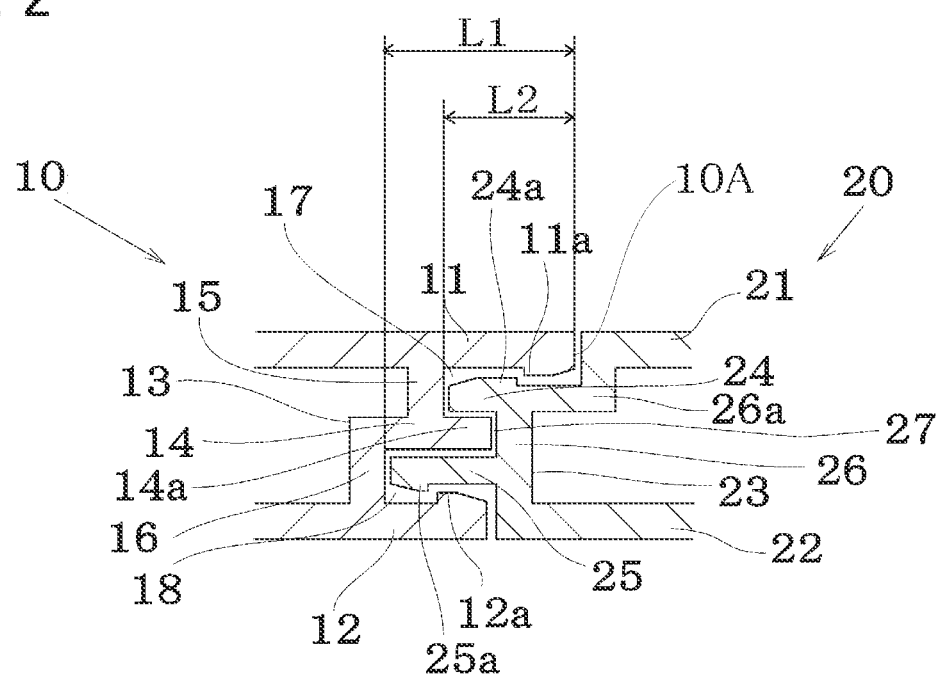
FIG. 2 is an enlarged view illustrating a connection part between adjacent panels.

FIG. 2 is an enlarged view illustrating the connection part between the first panel 10 and the second panel 20.

The adjacent panels are connected to each other by fitting of a plurality of fitting portions. In FIG. 2, the plurality of fitting portions is arranged in the up-down direction in the thickness direction of the panel 10 (20). The plurality of fitting portions may also be arranged side by side in the width direction of the panel 10 (20); however, arrangement of the plurality of fitting portions in the up-down direction in the thickness direction of panel 10 (20) can exert effects described later. Each of the fitting portions is configured by a pair of fitting recess and fitting piece that can be fitted to each other.

If the fitting recess is a recess formed by a bottom portion and a pair of side portions uprightly provided on both sides of the bottom portion, the fitting piece is inserted between the pair of side portions, and a pair of fitting recess and fitting piece forms a single fitting portion.

Each of the fitting portions may be configured such that the side portions of the fitting recess and the fitting piece can abut to each other and furthermore a vertex of the fitting piece in a protruding shape can abut to the bottom portion of the fitting recess.

Hereinafter, the fitting connection between the first panel 10 and the second panel 20 will be specifically described.

The first panel 10 has first ribs 13 as ribs located on both end side that connect the upper surface 11 to the lower surface 12.

Each first rib 13 includes: an intermediate portion 14 arranged in parallel with the upper surface 11 and the lower surface 12; and a first bottom portion 15 and a second bottom portion 16 that respectively connect the intermediate portion 14 to the upper surface 11 and the lower surface 12 in the up-down direction.

In the present embodiment, one end of the first panel 10 is provided with two fitting recesses 17, 18 and one fitting piece 14a. The first recess 17 includes: a pair of side portions formed by a tip end of the upper surface 11 and the intermediate portion 14; and a first bottom portion 15. The second recess 18 includes a pair of side portions formed by a tip end of the lower surface 12 and the intermediate portion 14; and a second bottom portion 16. The first panel 10 includes these two fitting recesses 17, 18 as well as one fitting piece that is the tip end of the intermediate portion 14 serving as a third protrusion 14a.

On the other hand, the second panel 20 is provided with two fitting pieces 24, 25 and one fitting recess 27 located at positions facing the first panel 10.

The second panel 20 has a second rib 23 as an edge rib that connects the upper surface 21 to the lower surface 22, and this second rib 23 faces the first rib 13 of the first panel 10.

The second rib 23 includes: a connecting portion 26 that connects respective tip ends of the upper surface 21 and the lower surface 22 in the up-down direction, and a first protrusion 24 and a second protrusion 25 that protrude from the connecting portion 26 toward the first rib 13 of the first panel 10.

These two fitting pieces (the first protrusion 24, the second protrusion 25) are inserted into the two fitting recesses (the first recess 17, the second recess 18) of the first panel 10, respectively, in a state in which the respective upper surfaces 11, 21 of the panels 10, 20 are approximately horizontal, to thereby form two fitting portions.

The end of the second panel 20 adjacent to the first panel 10 further includes a third recess 27 having a pair of side portions formed by the first protrusion 24 and the second protrusion 25, and also having a bottom portion formed by the connecting portion 26. The third protrusion 14a of the first panel 10 is fitted into this third recess 27.

The present embodiment is an example having three fitting portions; however, it is sufficient if the adjacent panels have two or more fitting portions and the panels can be connected to each other. Alternatively, one of the adjacent panels may be provided with only a plurality of fitting recesses and the other panel may be provided with only a plurality of fitting pieces.

For example, the first rib may be provided with an additional intermediate portion and a bottom portion that connects these two intermediate portions to each other in the up-down direction. With this configuration, a recess formed by these two intermediate portions and the bottom portion can be newly formed, and the second rib is provided with a protrusion corresponding to this recess to increase fitting portions.

FIG. 2 illustrates a state in which a gap is formed between the recess 17 (18) and the protrusion 24 (25) to provide fitting with a looseness (loose fitting). This gap is for explaining that the adjacent panels can be easily fitted to each other in the horizontal direction. As far as the panels can be assembled to each other, this gap may be eliminated to provide a tight fitting state.

In the present embodiment, the two fitting recesses 17, 18 provided to the first panel 10 are aligned in the up-down direction, and a distance L1 from an endmost surface 10A of the first panel 10 to the bottom portion 16 of the lower fitting recess 18 is longer than a distance L2 from the endmost surface 10A to the bottom portion 15 of the upper fitting recess 17 (L1>L2). That is, of the two fitting recesses 17, 18 provided to the first panel 10, the bottom portion 15 of the first recess 17 is closer to the endmost surface 10A of the first panel 10 than the bottom portion 16 of the second recess 18 is. That is, the first bottom portion 15 is located closer to the second panel 20 than the second bottom 16 is.

Corresponding to this, the positions of the vertexes of the two fitting pieces 24, 25 provided to the second panel 20 are different corresponding to the positions of the bottom portions 15, 17 of the two fitting recesses 17, 18. That is, of the two fitting pieces 24, 25 provided to the second panel 20, the vertex of the second protrusion 25 is located at a position protruding more greatly toward the first panel 10 than a position of the vertex of the first protrusion 24.

In this manner, at the connection part between the adjacent panels, the positions of the bottom portions of the plurality of fitting recesses provided to one panel may be different in the panel connecting direction, and corresponding to this, the vertex positions of the plurality of protrusions provided to the other panel may be different in the connecting direction of the panels.

Figure 3:
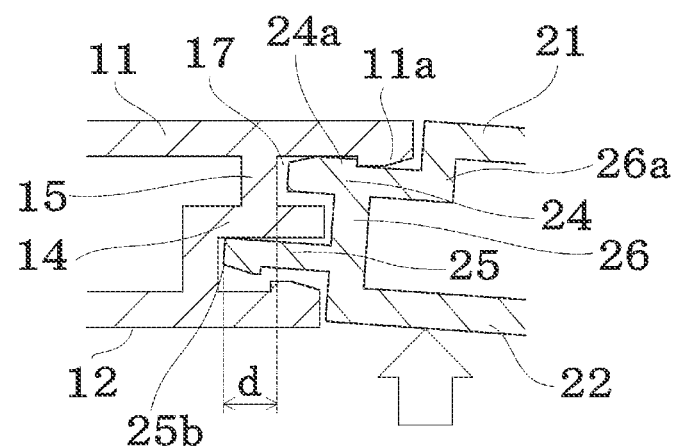
FIG. 3 illustrates an example of a state when a load is upwardly applied from below one of the panels in FIG. 2.

Accordingly, for example, as illustrated in FIG. 3, when a load is applied to the lower surface 22 of the second panel 20 in the upward direction, the load can be received by the first bottom portion 15 from the second recess 25 via the intermediate portion 14 of the first panel 10.

That is, since the positions of the bottom portions of the plurality of recesses are different, an overlap portion d is formed between a vertex 25b of the second protrusion 25 and the first bottom portion 15 of the first recess 17 in a side view.

To the contrary, if the positions of the bottom positions of the two fitting recesses 17, 18 aligned in the up-down direction satisfy L1≤L2, the bottom portion 15 of the upper fitting recess 17 cannot receive the load.

In the present embodiment, the first recess 17 is provided with a first locking portion 11a, the first protrusion 24 is provided with a first locked portion 24a, the second recess 18 is provided with a second locking portion 12a, and the second protrusion 25 is provided with a second locked portion 25a, respectively. The first locking portion 11a and the first locked portion 24a, and/or the second locking portion 12a and the second locked portion 25a are lockable to each other at least when the load is applied upward from below the under member 1. The pair of fitting recess 17 (18) and fitting piece 24 (25) is locked to each other in the right-left direction and thereby the connection part between the panels 10, 20 becomes more rigid.

Note that the third recess 27 and the third protrusion 14a may have a locking portion and a locked portion that are lockable to each other.

In the present embodiment, for example, as illustrated in FIG. 3, the connecting portion 26 provided to vertically extend from the tip end of the lower surface 22 of the second panel 2 is connected to the tip end of the upper surface 21 via a step 26a in a substantially L-shape, and the tip end of the upper surface 21 is located farther from the first panel 10 than the connecting portion 26 is.

Corresponding to this, the tip end of the upper surface 11 of the first panel 10 (the endmost surface 10A of the first panel 10) is formed to protrude toward the second panel 20 more greatly than the connection part 26. In the present embodiment, this tip end of the upper surface 11 is formed to protrude downward to serve as the first locking portion 11a, and the base side of the first protrusion 24 of the second panel is formed to be pulled upward and serve as the first locked portion 24a.

In addition, in the present embodiment, the tip end of the lower surface 12 of the first panel is provided with the second locking portion 12a, and the tip end of the second protrusion 25 of the second panel 20 is provided with the second locked portion 25a to be lockable to this second locking portion 12a. Note that the positions at which the locking portion and the locked portion are provided can be selected as appropriate.

It is preferable that a pair of the recess 17 (18) and the protrusion 24 (25) in each set is loosely fitted to each other with a gap having a predetermined clearance, and the locking portion 11a (12a) and the locked portion 24a (25a) come into a mutual locking state when a load is applied.

With this configuration, for example, in a state in which the upper surface 11, 21 of each panel 10, 20 is approximately horizontal, the recess 17 (18) and the protrusion 24 (25) can allow smooth connection between the panels 10, 20 without causing interference between the locking portion 11a (12a) and the locked portion 24a (25a).

The locking portion 11a (12a) and the locked portion 24a (25a) may be each formed in a claw-shape such that their claws catch each other when the panel 10 (20) becomes slightly inclined.

Figure 4:
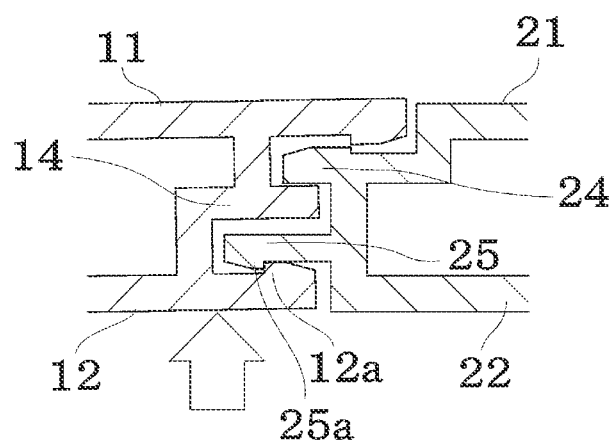
FIG. 4 illustrates an example of a state when a load is upwardly applied from below the other of the panels in FIG. 2.

By providing the locking portion 11a (12a) and the locked portion 24a (25a) in the above manner, as illustrated in FIG. 3, FIG. 4, when a load is upwardly applied from below either panel of the adjacent panels 10, 20, the first locking portion 11a and the first locked portion 24a and/or the second locking portion 12a and the second locked portion 25a come into a mutual locking state; therefore, the strength of the connection part becomes increased.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

The invention claimed is:

1. A protective structure for a battery pack mounted under a floor of a vehicle, the protective structure comprising:
   a case body accommodating the battery pack; and
   an under member arranged below the case body,
   the under member including:
      a plurality of panels; and
      a plurality of fitting portions that connect adjacent panels of the plurality of panels to each other, and
   each of the plurality of fitting portions including:
      a fitting recess provided to either one of the adjacent panels; and
      a fitting piece provided to the other one of the adjacent panels and fitting into the fitting recess,
   wherein each of the plurality of fitting portions includes a pair of the fitting recesses and the fitting piece, one of the pair including a locking portion, and the other of the pair including a locked portion, and
   the locking portion and the locked portion come into a mutual locking state at least when a load is upwardly applied from below the under member.

2. The protective structure for the battery pack according to claim 1, wherein
   when no load is applied, a predetermined clearance is provided between the locking portion and the locked portion.

3. The protective structure for the battery pack according to claim 1, wherein
   in one panel of the adjacent panels two fitting recesses among the plurality of fitting portions are provided and aligned in an up-down direction, and a distance from an endmost surface of the one panel to a bottom portion of a lower fitting recess among the two fitting recesses is longer than a distance from the endmost surface to a bottom portion of an upper fitting recess among the two fitting recesses, and
   in the other panel of the adjacent panels two fitting pieces among the plurality of fitting portions are provided, and positions of vertexes of the two fitting pieces are different corresponding to positions of the bottom portions of the two fitting recesses.

4. The protective structure for the battery pack according to claim 2, wherein
   in one panel of the adjacent panels two fitting recesses among the plurality of fitting portions are provided and aligned in an up-down direction, and a distance from an endmost surface of the one panel to a bottom portion of a lower fitting recess among the two fitting recesses is longer than a distance from the endmost surface to a bottom portion of an upper fitting recess among the two fitting recesses, and
   in the other panel of the adjacent panels two fitting pieces among the plurality of fitting portions are provided, and positions of vertexes of the two fitting pieces are different corresponding to positions of the bottom portions of the two fitting recesses.

5. A protective structure for a battery pack mounted under a floor of a vehicle, the protective structure comprising:
   a case body accommodating the battery pack; and
   an under member arranged below the case body,
   the under member including;
      a plurality of panels; and
      a plurality of fitting portions that connect adjacent panels of the plurality of panels to each other, and
   each of the plurality of fitting portions including:
      a fitting recess provided to either one of the adjacent panels; and
      a fitting piece provided to the other one of the adjacent panels and fitting into the fitting recess,
   wherein in one panel of the adjacent panels two fitting recesses among the plurality of fitting portions are provided and aligned in an up-down direction, and a distance from an endmost surface of the one panel to a bottom portion of a lower fitting recess among the two fitting recesses is longer than a distance from the endmost surface to a bottom portion of an upper fitting recess among the two fitting recesses, and in the other panel of the adjacent panels two fitting pieces among the plurality of fitting portions are provided, and positions of vertexes of the two fitting pieces are different corresponding to positions of the bottom portions of the two fitting recesses.

\* \* \* \* \*